Feb. 24, 1970    C. A. KIESLING    3,497,760
LOGICAL EXPANSION CIRCUITRY FOR DISPLAY SYSTEMS
Filed June 10, 1968    6 Sheets-Sheet 1
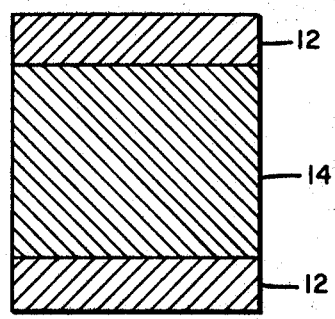
Fig. 1
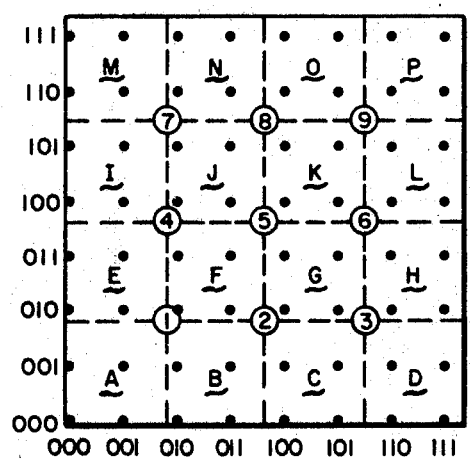
Fig. 2a
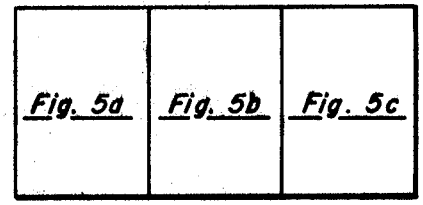
Fig. 5
Fig. 2b
INVENTOR
CHARLES A. KIESLING
BY *Charles A. Johnson*
ATTORNEY

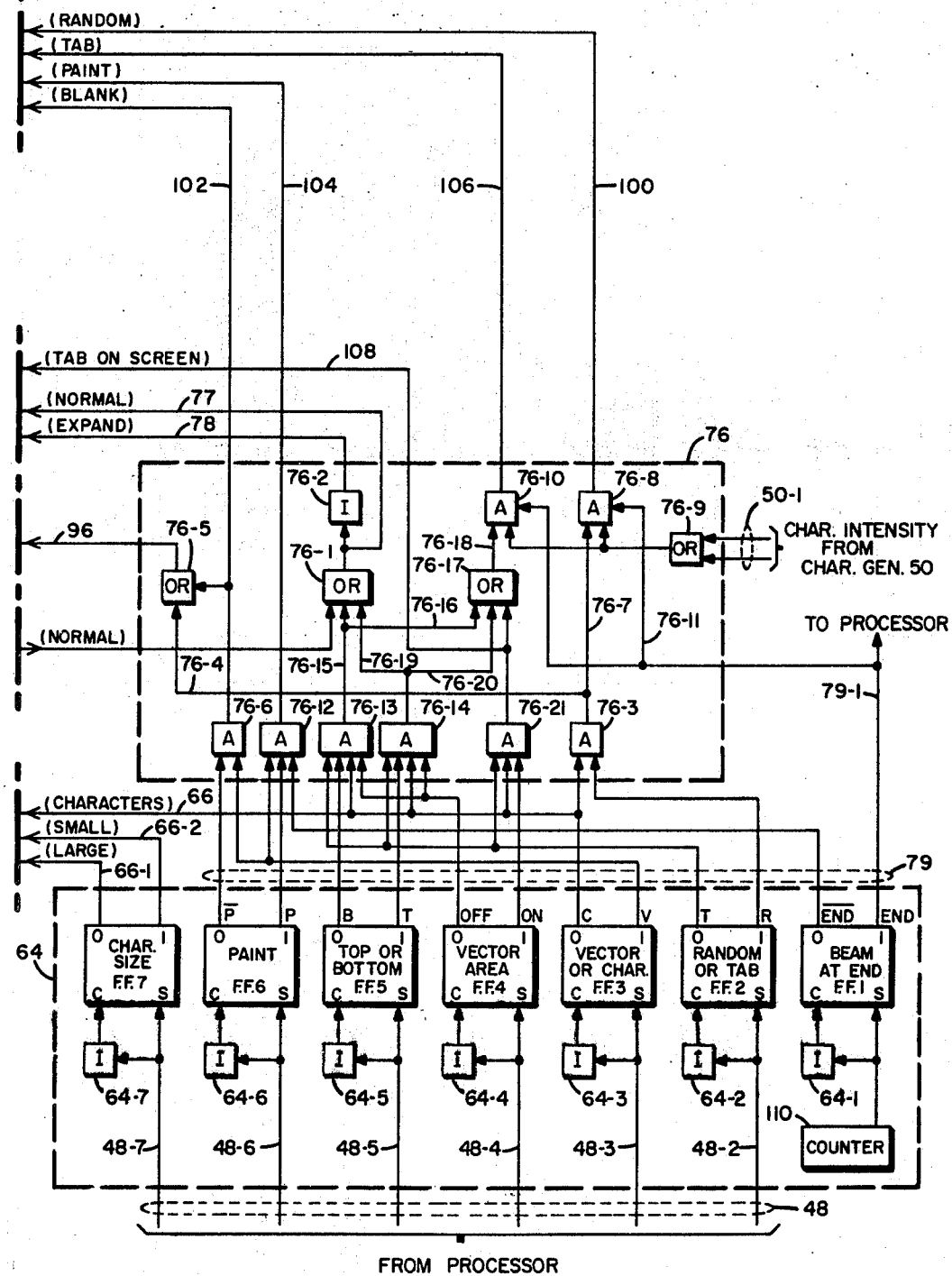

United States Patent Office 3,497,760
Patented Feb. 24, 1970

3,497,760
LOGICAL EXPANSION CIRCUITRY FOR DISPLAY SYSTEMS
Charles A. Kiesling, Minneapolis, Minn., assignor to Sperry Rand Corporation, New York, N.Y., a corporation of Delaware
Filed June 10, 1968, Ser. No. 735,617
Int. Cl. H01j 29/70
U.S. Cl. 315—18        9 Claims

ABSTRACT OF THE DISCLOSURE

A display system having at least a first area for displaying characters and a second area for displaying both vectors and characters, and having the ability to expand both the characters and the vectors in the second area is described. Circuitry for selecting an expanded mode for at least a part, or sector, of the second area is also described. If the electron beam tends to move off-screen out of the selected sector of the second area when in the expanded mode, circuitry is provided such that the digital beam position is complemented and the beam is blanked to allow the blanked beam to stay on-screen while moving to the on-screen position where the beam is to re-enter the selected sector for display. Override circuitry is also described such that when the display system is in the expanded mode and a command is given to go from the selected expanded sector of the second area to a position in the first area, the expansion circuitry is overriden to allow normal operation of the display system while the beam is in the first area. The display system has the capability of displaying a series of characters, referred to as tabular characters. Circuitry is described such that when the system is in the expanded mode a sequence of tubular characters beginning outside of the bounds of the expanded sector are blanked and are continually blanked throughout the series of tabular characters. This eliminates the trailing-end of fragmented tabular character series. The display system also includes the capability of displaying single characters, referred to as random characters. Circuitry is also described such that when the display system is in the expanded mode, the spacing between random characters is expanded, but the spacing between tabular characters is not expanded thereby retaining their readability.

BACKGROUND OF THE INVENTION

Field of the invention

This invention relates generally to visual display systems utilizing a cathode ray with a two-dimensional display of messages on the face of the display tube. Display systems are becoming increasingly important in the data processing industry for use in displaying alphanumeric and graphic data. In order to display alphanumeric characters, it is necessary to utilize a character generator, and in order to display graphic data, it is necessary to utilize a vector generator. For many applications, it is desirable that these vector and character display systems include the ability to expand selected sectors of the display area for greater ease of reading.

Description of the prior art

Prior art devices which have been provided systems for expanding the data displayed on the screen lack the ability to perform several important functions which are required for full and proper use of the display systems. Basically, in the prior art systems that provide for expanding the data displayed, the entire viewing screen is expanded. It has been found desirable that at least a portion of the display screen be of a permanent display characteristic even when another portion of the screen is to be expanded. This feature of holding a portion of the screen constant, that is unexpanded, while expanding another portion of the screen is not to be found in the prior art. This capability requires the ability to update the information in the non-expandable area even when the remainder of the display area is in an expanded mode.

The prior art expanding display systems have an inherent delay in the time that is required for the beam to settle down once it has been driven to an off-screen position and is then brought back into a position in the expanded portion that is to be displayed. In the prior art, when a particular sector of the display screen is expanded, and the electron beam starts to move out of that sector, the prior art circuits blank the electron beam and hold it in that location. However, when the beam is to come back into the expanded area, a time delay must be incorporated in order to give the beam time to position and to settle down and begin tracing (the displaying operation) in the proper location. This time delay causes a reduced operational rate.

The prior art display devices do not have provision for expanding the spacing between particular characters in a selected sector while not expanding the spacing between other types of characters. This feature obtains significant proportion in display systems that provide for displaying both word-messages and character-messages in that by expanding the spacing between letters of a word message, ambiguity can be raised in the mind of the viewer as to whether the letter combination is in fact a word message or whether the letters are in fact several discrete letter-messages.

Closely associated with the foregoing problem of the prior art is that the prior display devices make no provission for correction of distortions or aberrations caused when a sector is expanded such that only the trailing portion of a word or sentence is present at the edge of the selected sector, with the leading portion of the message being in another unselected sector. The prior art systems make no provision for deleting these partial-message displays at the edge of the sector and can lead to erroneous interpretations of the messages displayed in the expanded sector.

SUMMARY

The display system of the present invention overcomes and provides marked advantages over the several disadvantages of the prior art display systems. Because of the well-recognized need for certain data to be present on the display screen even though a selected sector of the remaining screen area is expanded, the present invention provides circuitry for holding data for display on at least a first area on the screen without expansion, and yet provides means for updating that data even though a sector of the second area is in the expanded mode. By utilizing the circuits of this invention, this split operation, that is a portion expanded and another portion unexpanded, can be accomplished without disturbing the circuits that are established for operating in the expanded mode.

This invention has also attended itself to the delay problem inherent in the prior art when the electron beam is tended to move out of an expanded sector to an off-screen position. Circuitry is included in this invention such that when a selected sector is expanded, and the beam tends to move out of the expanded sector to an off-screen position, the beam is blanked and its position is digitally calculated and complemented in a manner to cause it to remain and move in a blanked on-screen path that is the mirror image of the off-screen path that would otherwise be followed. This operation results in a movement of the electron beam such that when the arithmetic indicated that the electron beam should be tending to move back into the expanded sector, the blanked electron beam has traced the appropriate blanked on-screen path and is at the proper position for entry back into the expanded sector without any time delay. Therefore, the time that is necessary to quickly move the beam to the on-screen position from a held position of the prior art, and the time necessary for allowing the electron beam to settle down such that display can be resumed, has been eliminated, and no time delay for this operation is required. Accordingly, an enhanced operational rate is realized.

The display system of the subject invention provides for displaying individual or so-called random characters, and grouped characters, such as for expressing word messages, which are referred to as tabular characters. Circuitry is provided such that the spacing between random characters in a selected sector can be expanded thereby holding the relative relationship of the random characters with regard to the other data that is also expanded. Holding this expanded relationship is important for many display applications. The circuitry also provides, however, for not expanding the spacing between tabular characters. This is important for holding the spacing in a word in order to clearly distinguish that the tabular characters are in fact character-combination messages which are to be viewed together, and are not thereby confused with the random characters. Therefore, when the selected sector is expanded, the circuitry provides for expanded spacing only between random characters, while providing that the spacing between tabular characters remain the same as that for tabular characters that would appear on the screen in an unexpanded mode.

The subject invention has also provided means for preventing distortion when a sector is expanded in which the trailing end of a word or message is present in the selected sector with the leading portion being present in an unselected sector. The circuitry of this invention operates under these conditions with tabular characters such that the sequence of tabular characters, both within and without the selected expansion sectors are blanked. This provision is included since it is felt that the trailing ends of messages would tend only to cause confusion to the viewer. The system provides additional circuitry, however, for displaying the remaining portions of tabular characters that start in the selected sector, but which extend to an adjacent unselected sector. In this operation, the tabular characters that would appear within the selected sector also would appear in the expanded mode, but those tabular characters which are not within the selected expanded sector are blanked.

In view of the foregoing, it is a primary object of this invention to provide an improved cathode ray tube display system including means for expanding the scale of the display for selected sectors for the display screen.

Yet another object of the invention is to provide a cathode ray tube display system having means coupled to the cathode ray tube for displaying data in the first and second areas and having circuitry including an expansion control circuit for expanding data in a selected sector of only the second area on the screen.

Still another object of the invention is to provide a cathode ray tube display system having circuitry coupled to the cathode ray tube for displaying character data in a first area of the screen and both character and vector data in a second area of the screen, and having circuitry including an expansion control circuit for expanding the data in a selected sector of only the second area of the screen without disturbing the data in the first area.

It is yet another object of the present invention to provide a display system having an expansion control circuit which includes circuitry for selecting a particular sector of an area to be expanded and producing a detection signal when the electron beam tends to move out of the selected expanded sector and to provide means for blanking the beam whenever the detection signal would indicate an off-screen beam position.

It is still another object of this invention to provide a display system having the cathode ray tube with first and second areas on the viewing screen and having means for receiving character signals representing that character data that is to be displayed in the first area, with control means coupled to the signal receiving means for overriding the expansion control circuit thereby causing normal display of the character signals received.

Yet a further object of the present invention is to provide an arithmetic circuit which causes the complement of the digital beam position to be used whenever the beam tends to move out of its expanded selected sector, whereby the blanked beam will follow an on-screen path which is the mirror image of the off-screen path that would otherwise be followed.

It is still another object of this invention to provide a display system having an expansion circuit wherein tabular character groupings which begin beyond the bounds of a selected expanded sector are blanked, and the blanking continues throughout the entire tabular character groupings even though the tabular characters continue into the selected expanded sector.

Yet another object of this invention is to provide a display system having an expansion circuit in which the spacing between tabular characters remains constant and is not expanded even though the tabular character groupings exist in a sector that is selected for expansion.

BRIEF DESCRIPTION OF THE DRAWINGS

The foregoing and other more detailed and specific objectives will be disclosed in the course of the following specification, with reference being made to the accompanying drawings in which:

FIGURE 1 is a diagrammatic representation of the total display area on a cathode ray tube screen showing upper and lower first areas for displaying characters and a second central area for displaying either or both vector and alpha-numeric character data;

FIGURE 2a is a view of the second area of the display screen showing the available addressable message positions on the display screen for that portion of the display screen that is subject to being expanded;

FIGURE 2b is a table relating to FIGURE 2a and illustrates the expanded sector numbers together with the associated areas that are expanded for the sector that is selected;

FIGURES 5a, 5b, and 5c, when arranged as shown in FIGURE 5, collectively are a detailed block diagram showing the novel circuit arrangements of the display system.

DESCRIPTION OF THE PREFERRED EMBODIMENT

Figure 3A:
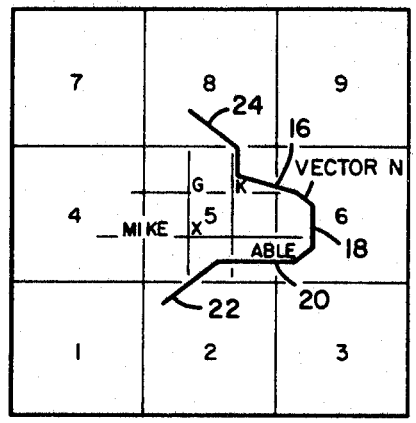
FIGURE 3a illustrates the expandable portion of the display screen in an unexpanded mode with a characteristic display shown thereon.

FIGURE 1 shows one arrangement of the cathode ray display screen in which areas 12 are available for displaying data which cannot be presented in an expanded mode. A second area 14, in this example the remainder of the display screen, is capable of displaying data in the normal or in the expanded mode. It should be understood that this display screen configuration is intended to be illustrative only, and that the upper or lower fixed area 12 could be eliminated, as well as being located at some other place on the display screen. Additionally, the dimensions of areas 12 and 14 can likewise be adjusted to the larger or smaller as desired.

As mentioned above, one of the objects of this invention is to provide an improved display system in which data in a specific area or areas of the display screen can be displayed in an unexpanded manner (normally) even when a selected sector of the remainder of the display area is displayed in an expanded mode. Provision is made for altering, or so-called updating, of the data to be displayed in this unexpandable area even though a selected sector in the second area is being operated in the expanded mode. FIGURE 2a shows the array of available message display addresses for the area 14 of the display screen. The addresses are illustrated along the left edge and along the bottom edge in a binary code. It can be seen that the X direction has a range of 0 through $111_2$ and in the Y direction has a range of 0 through $111_2$. This can be seen to be an 8 x 8 array or providing for 64 gross electron beam positions. This array is of course illustrative only, and a display could have many more co-ordinate positions, it being understood that this example provides a means for explaining how the system works without confusing the understanding of the invention. The numerals 1 through 9 appearing within the circles in FIGURE 2a identify the sector numbers that are subject to being selected for expansion. For instance, referring to sector 1 it can be seen that it is bounded by areas A, B, E and F. Next considering sector 2 it can be seen that it is bounded by the areas B, C, F, and G. In making the selection between sectors 1 and 2 it can be seen that areas B and F are common to the two sectors 1 and 2. When considering sector 5, which is comprised of areas F, G, J and K, it can be seen that there are areas common to all of the other sectors. It can be seen, then, that each sector that can be selected for expansion comprises specific areas of the face of the display. In FIGURE 2b is shown a table that identifies the specific areas by letter that are included in the enumerated sectors. It should be understood that the various sectors that can be selected, as shown in FIGURE 2a are expanded by the circuitry of this invention to approximately fill the area 14 illustrated in FIGURE 1.

It is old and well-known that to double the display scale of a selected sector, it is merely necessary to discard the most significant bit in each of the X and Y addresses, shift those addresses so as to multiply the significance of each of the remaining bits by 2, and suppress the display of all characters having original addresses falling outside the sector selected. It is also old and well-known that to expand any of the overlapping sectors such as 2, 5, 8 and 4, 5, 6 there is the additional step of complementing the most significant bit in the expanded X or Y address or both.

FIGURE 3a shows the expandable area 14 with its nine expandable sectors, having what might be called a typical message shown thereon. It should be understood of course that the numerals 1 through 9 would not appear on the display, but are merely utilized for reference purposes. The data message shown in FIGURE 3a includes a vector N, the words CAT, MIKE, and ABLE, and the random characters G, K, and X. It will be noted that the word MIKE begins in sector 4 and ends in sector 5, while the word ABLE begins in sector 5 and ends in sector 6. It will also be noted that the word CAT is entirely within sector 5. These words are formed with characters known as tabular characters, often referred to as tab characters. It would be appropriate here to again distinguish the tabular characters from the random characters such as G, K, and X. The random characters are those characters which may be positioned in any specified location in the expandable area of this display screen, and the tabular characters are those groupings of characters that have a predetermined spacing. To display the messages shown in FIGURE 3a the beam positioning circuits are commanded to move the blanked beam to a particular location in which the desired character or line is to be displayed (painted) and then the beam is specifically commanded to move to a new location where the next specific character is displayed. However, when a signal representing a tabular character is presented, the blanked beam is moved to the predetermined starting position; the first tabular character is displayed; the blanked beam is moved a fixed increment; the beam again stops; and the next tabular character is displayed. This movement of a fixed increment and the displaying of the next subsequent tabular character continues until all of the tabular characters in the sequence have been displayed and the control signal indicating that tabular characters are being displayed has been removed. Accordingly, tabular characters are placed side by side automatically while random characters, if they are to be placed side by side, must have a particular command associated with each character to cause the blanked beam to be positioned to the desired random character location. Again referring to FIGURE 3a, it will be seen that the words CAT, MIKE, and ABLE are words comprised of tabular characters while the characters G, K, and X are random characters each of which must be located by a specific command.

Figure 3B:
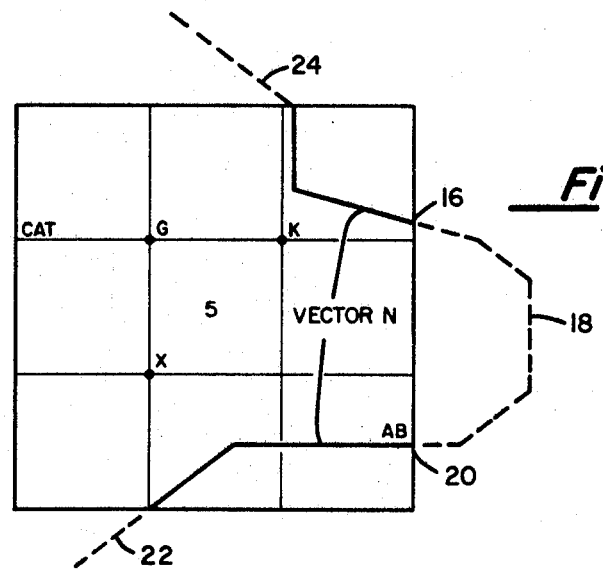
FIGURE 3b illustrates the results of expanding sector 5 of FIGURE 3a and additionally illustrates the path the blanked beam would attempt to follow if allowed to pass off-screen out of the expanded sector.

Turning now to a consideration of FIGURE 3b, which shows sector 5 of FIGURE 3a in its expanded state, it will be noted that the random characters G, K, and X have had their relative spacing expanded in the same proportion as vector N. It should be noted, however, that the word CAT, which is formed with tabular characters, has not had the spacing between the characters expanded. Accordingly, the same readability is present in the expanded mode as is present in the unexpanded mode. It can be seen that the letters KE of the word MIKE are not shown in the expanded view of sector 5 in FIGURE 3b. This follows since the word MIKE began in sector 4 and only the data in sector 5 is shown. Accordingly, the letters KE would form nonsensical information in the expanded sector and would tend to be confusing to the viewer. It will be noted at the other edge of the expanded sector, however, that the letters AB of the word ABEL are shown in the expanded view of sector 5. It has been determined that the starting portion of tabular character messages may be useful even though not completely spelled out, and are therefore displayed in the expanded sector. Of course it is clear that the letters LE which are in sector 6 are not shown since they are not a portion of the expanded sector 5.

Figure 3C:
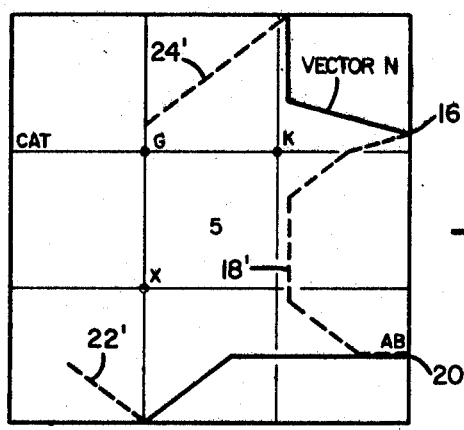
FIGURE 3c illustrates the expanded sector 5 of FIGURE 3a and illustrates the path the blanked beam will follow when caused to stay within the expanded area.

FIGURE 3b also illustrates in dashed line form the expanded portion of vector N that is in sector 6, and illustrates the path the blanked beam would tend to follow, through the arithmetic manipulations of the addresses, were it allowed to do so when in the expanded mode. It can be seen that the beam tends to go off-screen. In the prior art systems, when the beam reaches point 16 at the right edge of the expanded sector shown in FIGURE 3b, it would be blanked and held in that position while the arithmetic manipulation would continue to operate as if the beam were going to follow path 18. When the addressing would reach the point 20 where the beam would be designated to re-enter the display area, it would be necessary to provide time for the blanked beam to move from point 16 to point 20 and to provide time for the beam to settle down. At this point, then, the beam would be unblanked and continue to move on the screen to continue displaying the remainder of vector N. Of course the same blanking and holding operation would occur for segments 22 and 24 which reside in sectors 2 and 8 respectively, and are outside the area of expanded sector 5. As mentioned above, this invention avoids the necessity of the time delay that occurs in the prior art whenever the beam is caused to be addressed to an off-screen position and is again subsequently caused to re-enter the selected expanded sector. This time delay is avoided by including circuitry in the addressing arithmetic unit to cause the beam to be blanked when it tends to go off-screen, and further to cause the arithmetic operation to be complemented and the blanked beam allowed to move on-screen continuously until it arrives at the point where it would normally re-enter the selected expanded sector. Directing attention to FIGURE 3c, this mode of operation is illustrated. In this illustration, the dashed lines illustrate the paths that the blanked beam would follow in tracing the on-screen paths for the portions of the vector N that would normally be off-screen. In this regard, it can be seen that the dashed path 18′ is the image of the path 18 illustrated in FIGURE 3b for that portion of the vector that resides in sector 6. Similarly, path 22′ is the image path for that portion 22 of vector N that is in sector 2, and path 24′ is the image of that portion of vector N that is in sector 8. With the circuitry of this invention using this method of operation, the system does not require a delay when the beam arrives at point 20 since it will be immediately ready to be unblanked and continue the display of the lower portion of vector N.

Figure 4:
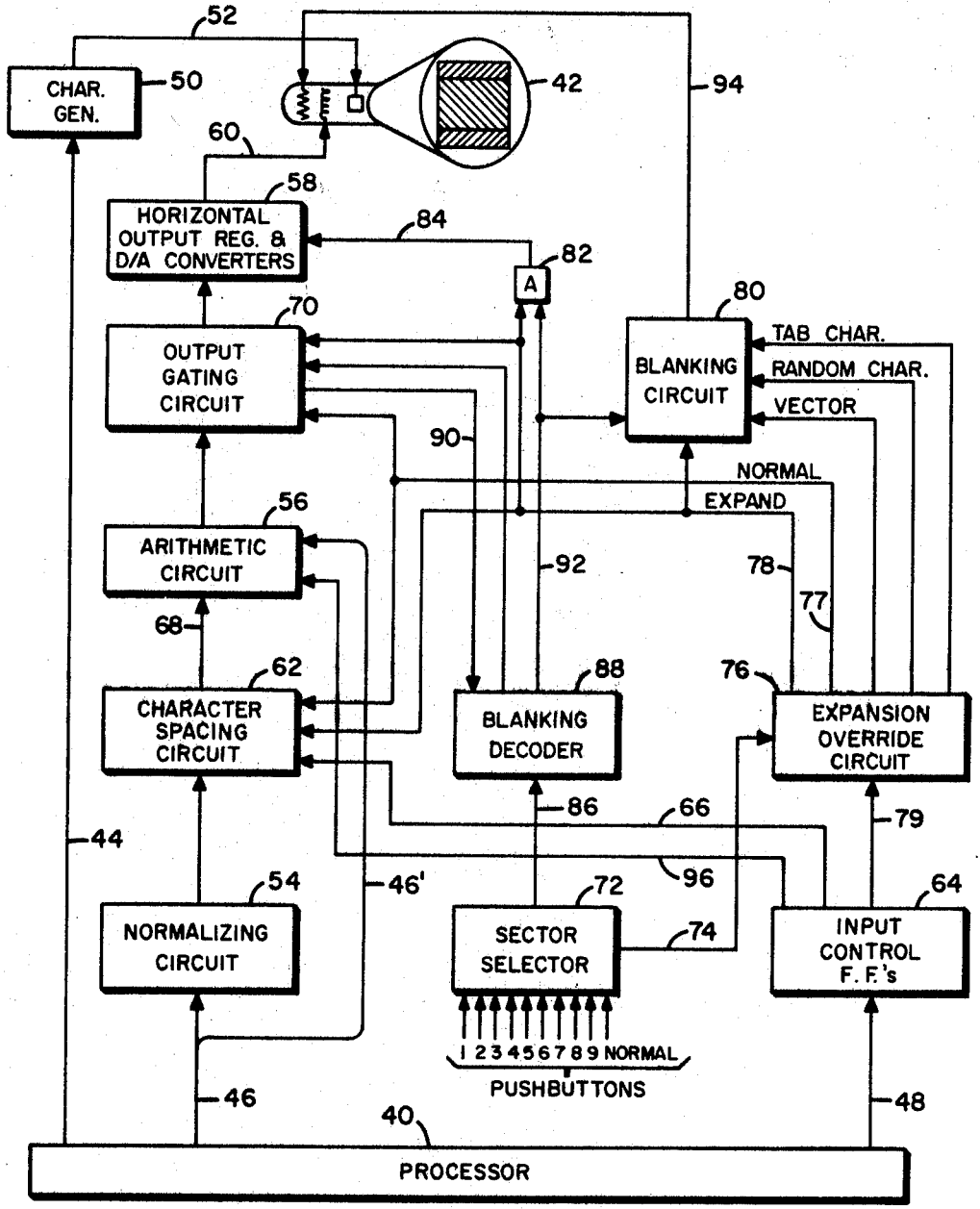
FIGURE 4 is a general block diagram of the display system of this invention.

Turning now to a consideration of FIGURE 4 which is a simplified and generalized block diagram of the system which includes the subject invention, where there is shown a processor 40 communicating with a cathode ray display 42. The processor 40 can be any of several commercially available processors and is utilized to provide digital character generating signals on line 44, digital X (or Y) vector component signals on line 46, and control signals on line 48. The processor will normally include data storage capacity and may include buffer storage for matching the rate of transfer to the display system. It will also have the capability to provide control signals to the display. The various control lines for activating and de-activating the display system that normally are utilized between a processor and the display are not shown since they do not tend to aid in the understanding of the invention. The vector component signals that are applied on line 46 may cause a vector to be displayed if the electron beam is activated, or may cause the blanked electron beam to move to a specified location on the face of the display screen where either a vector can be started or a character displayed. If a character is to be displayed, the signals on line 46 will move the beam to the location specified, and then the character signals on line 44 will cause a character generator 50, which is coupled to the display 42 by line 52, to generate the designated character. The character generator 50 can be selected from those available commercially, and can be of the type disclosed in commonly assigned patent application Ser. No. 436,174, filed Mar. 1, 1965. The manner in which the vectors are to be displayed has been disclosed in commonly assigned copending application Ser. No. 701,432 filed Jan. 29, 1968. In the last named copending application, a system is described whereby vectors exceeding a certain size are normalized and then treated as a series of segments to form the total specified vector. Therefore, a normalizing circuit 54 receives the vector component signals applied on line 46 and inspects each of the X–Y vector components in input registers that are to be added to the present beam position. The normalizing circuit is disclosed in the last identified copending application and will not be described in detail, it being understood that the normalizing circuit includes a portion for establishing a normalized segment and a counter for establishing the number of times the normalized segment is to be added to the present beam position to achieve the desired vector. When the normalizing circuit 54 examines the input component, the normalizing circuit causes the component data to be shifted one or more places in storage registers until the vector component is scaled to some value equal to or less than a predetermined value for those component values that exceed the predetermined value when tested. When the scale value is reached, it is repeatedly added to the data representing the present beam position in both the horizontal and vertical co-ordinates until the vector starting point is reached. Also included in the circuitry for calculating the beam position is an arithmetic circuit 56, which includes an adder, and horizontal output register and digital-to-analog (D/A) converters 58. Since the operation of these circuits has been described in the above identified copending application they will not again be described here. The horizontal output register and digital-to-analog converters 58 provide signals on line 60 to the horizontal deflection circuitry of the display system 42. At this point it should be emphasized that the block diagram of FIGURE 4 illustrates the horizontal display control only and that a similar arrangement of the control circuits would be required for the vertical deflection control. The vertical deflection control is not shown, however, since it would not add appreciably to the ease of understanding of the invention.

It will be recalled from above, that the displaying of tabular characters specified that there would be automatically established spacing between the respective tabular characters. To achieve this automatic spacing, a character spacing circuit 62 is utilized. The character spacing circuit will be described in more detail below. Functionally, it operates under control of selected ones of the input control flip-flops 64 to achieve the automatic increment of spacing. The ones of the input control flip-flops 64 that are relevant in the determination of the character spacing are the character size flip-flop and the flip-flop that determines whether a character or a vector is being displayed. These control signals are transmitted over line 66 to the character spacing circuit 62. The character spacing circuit 62 operates to force over line 68 the increment of spacing to the arithmetic circuit 56. The output gating circuit 70 operates on the value received from the arithmetic circuit to finally alter the value to be applied to the horizontal output register and D/A converters 58. The operation of the output gating circuit 70 will be described in more detail below.

One of the primary objectives of this invention is to provide a means for selecting a designated sector on the face of the cathode ray display 42 for expansion to cover the portion 14, as described above. In order to make the selection, a sector selector 72 is coupled to ten switches, which individually operate to apply an activating voltage to the sector selector. Switches one through nine are mutually exclusively operable for selecting the sector designated for expansion. A tenth switch labelled Normal is selected whenever the display 42 is to be operated in the normal, or nonexpanded mode. The result of selecting the normal switch is to provide a signal on line 74 which is directed to the expansion override circuitry 76 thereby causing that circuitry to operate in the normal mode, and to provide a Normal signal on line 77. The expansion override circuitry 76 also receives a plurality of control signals over line 79 from the input control flip-flops 64. The physical arrangement of the ten switches, or push-buttons, is such that they are interlocked such that whenever any one of switches one through nine is selected the Normal switch is disconnected. By disconnecting the Normal switch, the normal signals provided on 74 and 77 are removed, and it results in the expanded mode of operation. When in the expand mode, the expansion override circuit 76 provides an Expand signal on line 78 which is directed to the blanking circuit 80 and as a control signal to the character spacing circuit 62. Additionally, the Expand signal is one of the control signals applied to AND circuit 82 which in turn provides one of the control signals to the horizontal output register and D/A converter 58. The output signal from AND 82 on line 84 operates to shift the addressing data signals being coupled to the horizontal output register a predetermined amount for causing expansion.

The sector selector 72 also provides control signals over line 86 to the blanking decoder 88. The blanking decoder receives signals over line 90 from the output gating circuits 70 and compares them with the signals received on line 86. The signals compared represent the two highest ordered bit positions of the data available in the output gating circuit 70. By comparing the signals from the sector selector 72 on line 86 with the two highest ordered bits in the output gating circuit 70, blanking decoder 88 can produce signals on line 92 which indicate when the present beam position, as represented by the data in the output gating circuit 70, is out of the area selected by the sector selector 72 for display. Therefore, when a signal is present on line 92 and is directed to blanking circuit 80, it indicates that the beam position is out of the sector that has been selected to be expanded. Accordingly, the signal on line 92 becomes a blanking signal which prevents an intensity enable signal from beam generated by the blanking circuit 80 on line 94 and operates to blank the electron beam of display 42. It should also be noted that the signal on line 92 from blanking decoder 88 is couple to AND gate 82 along with the Expand signal on line 78. These two signals represent that the circuit is in the expand mode but that the arithmetic data representing the present beam position is out of the desired sector to be expanded and therefore a signal is produced by AND gate 82 on line 84 to cause the signals being received to be complemented and results in the blanked beam being moved within the sector as shown and discussed with relation to FIGURE 3c. Thus, when in the expanded mode, if the electron beam tends to move off-screen out of the selected expanded sector of the area of the display 42, the digital beam position being coupled to the horizontal output register 58 is complemented and the beam is blanked by the signal on line 92, thereby allowing the blanked beam to stay on-screen while moving to the on-screen position for the beam would have re-entered the selector sector had it continued in an off-screen path.

Turning now to a consideration of the display system when it is selected in the expanded mode and a command is given to go from the selected expanded sector to a position in one of the areas 12 where characters will be displayed, it can be seen that processor 40 will produce signals on line 48 which will set the proper input control flip-flops 64. The operation of the appropriate input control flip-flops will result in signals on line 78 to the expansion override circuit 76 which will produce output signals on line 77 to override the Expand signal on line 78 and cause the Normal output signal to appear. As will be described in more detail below, one of the input control flip-flops will produce a signal on line 96 which is directed to the arithmetic circuit 56 and indicates that the electron beam is to be positioned. The signal on line 96 enables the addressing data provided on line 46 to pass on line 46' directly to the arithmetic circuit 56, thereby bypassing the normalizing circuit 54 and the character spacing circuit 62. The addressing data presented on line 46 at this time will be a total address with regard to the reference side of the display and will cause the blanked electron beam to be forced to the specified starting position. This addressing data which represents the position in the area 12 of the display 42 to which the beam is to move is coupled directly through the output gating circuit 70 due to the gating signal of the normal operation received on line 77. Having thus forced the position of the blanked beam, the display 42 is in a condition to either display a series of tabular characters or to display a random character. Since the display is going to be in the area 12 of the display 42, the next control signal to be received on line 48 sets the appropriate input control flip-flop 64 such that a signal on line 66 will indicate that characters are to be displayed. This Character signal on line 66 and the Normal signal on line 77, both of which are coupled to the character spacing circuit 62, cause a set of digital data values representing the spacing between characters to be coupled to the arithmetic circuit 56 and added to the present beam position. The character signals will then be provided on line 44 to the character generator 50 which in turn will display the appropriate character. If tabular characters are being displayed, this space and display sequence will be repeated until such time as the control signal is given that the tabular character sequence has been completed. The foregoing has been a general discussion of the operation of this improved display system. A consideration of the detailed logic arrangement of FIGURES 5a, 5b and 5c will indicate the specific operation of the elements described generally above.

Figure 5A:
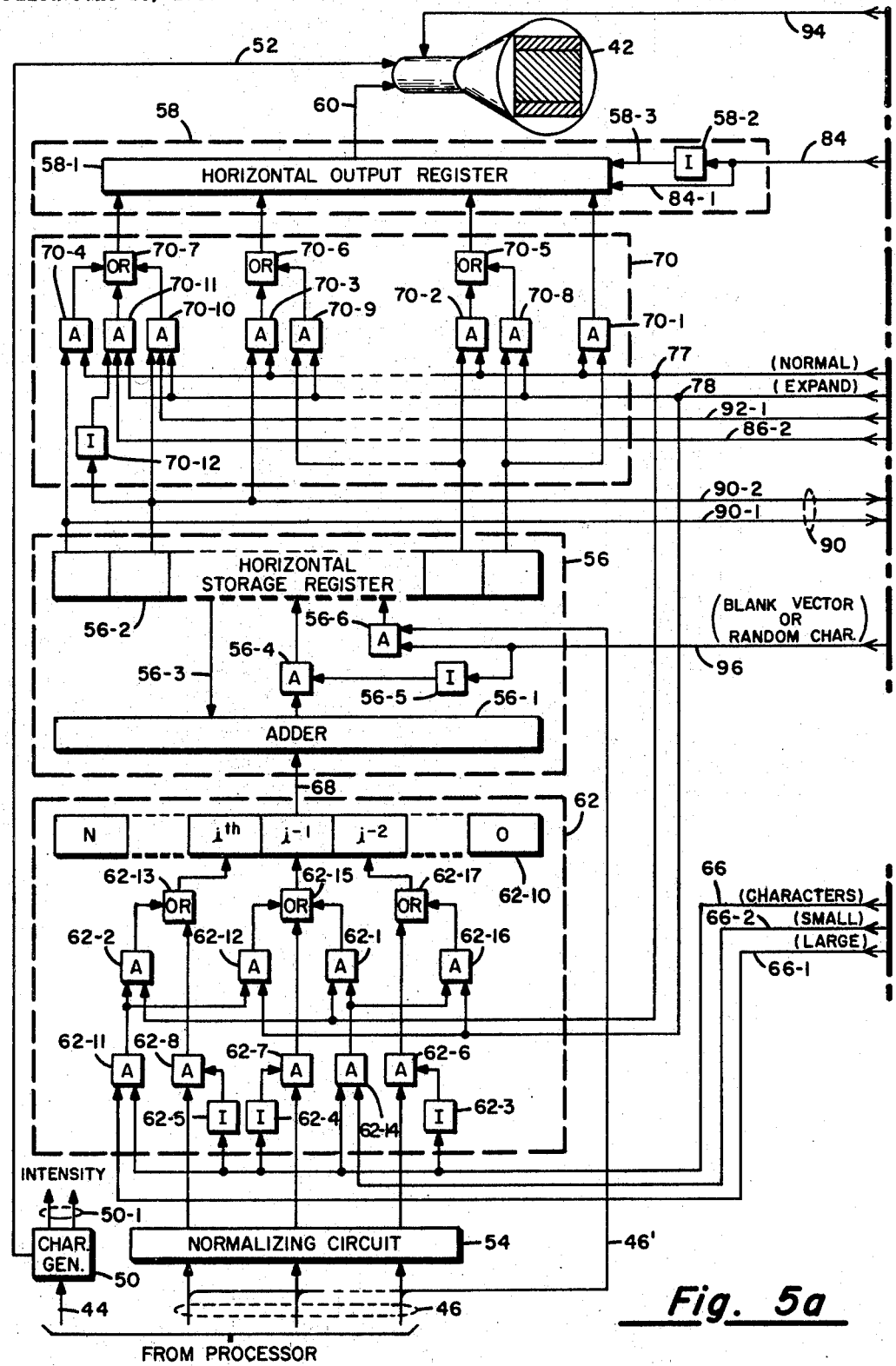
Figure 5B:
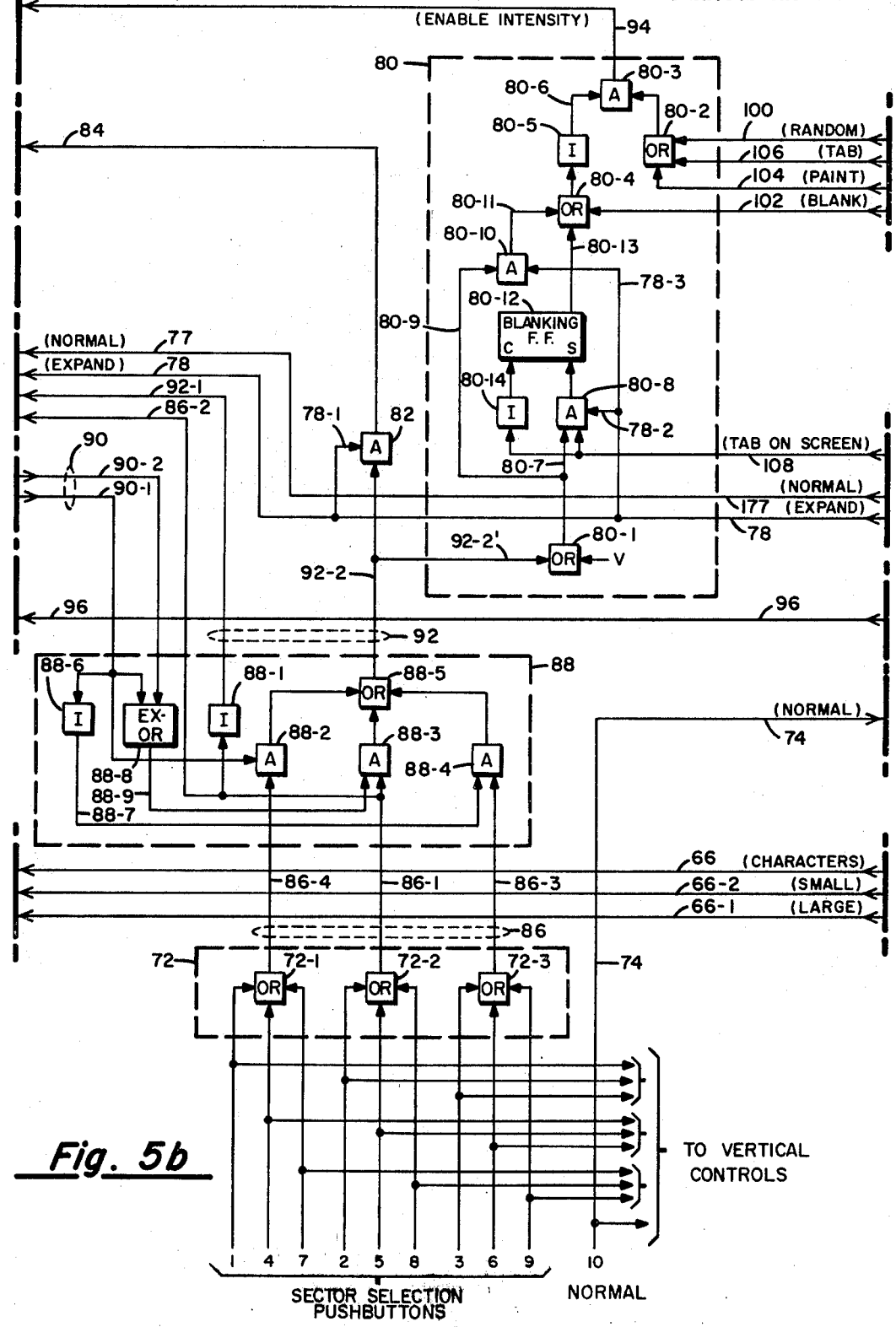

Having considered the broad functional operations of the invention, the following discussion will be with regard to the detailed logic illustrated in FIGURE 5a, FIGURE 5b, and FIGURE 5c, when arranged as shown in FIGURE 5. These figures collectively are a detailed logic block diagram of the portions of the improved display system that provide the functions of this invention. In these figures, elements that have been previously described are provided with the same reference numerals as utilized previously. Lines in FIGURE 4 that are comprised of more than one conductor, are shown cabled in these figures with the individual conductors being provided with a dash numerical designation appended to the cabling numeral. The logic circuits illustrated in these drawings are of a conventional type readily available in the commercial marketplace. These logic circuits include AND circuits, which have the logical function of providing an output 1 signal when all input signals are 1. In the event that any input signal is other than 1, the output of the AND circuit will be 0. The OR circuit operates such that any input terminal receiving a 1 signal will result in the output terminal providing a 1 signal. Only for those situations where all input terminals receive 0 signals will the output terminal provide a 0. The inverter circuits are referred to as I and operate to invert the function of the input signal such that if a 1 signal is received at the input, a 0 signal is provided at the output, and a 0 at the input results in a 1 at the output. The flip-flop circuits (F/F) are bistable flip-flop circuits and are of an operation such that it requires a 1 input to the set terminal(s) to provide a 1 at the 1 output terminal. When the flip-flop is providing a 1 at the 1 output terminal, it will be providing a 0 at the 0 output terminal. When a 1 signal is received at the clear input terminal (C), the flip-flop will provide a 1 at the 0 output terminal and a 0 at the 1 output terminal. The circuit operation is such that when the flip-flop has been set by providing a 1 at the S input terminal, a subsequent 0 at the S input terminal will be ineffective to alter the state of the flip-flop. In order to clear the flip-flop it is necessary to subsequently apply a 1 to the C input terminal. The Exclusive-OR circuit (EX-OR) is a circuit that provides a 1 output signal if, and only if, only one of the two input terminals is receiving a 1 signal. In the event the input terminals each receive 0 signals or each receive 1 signals, the output of the Exclusive-OR will be a 0 signal. The registers are comprised of a plurality of parallelly arranged flip-flop circuits. It should be understood that the arbitrary reference to 1's and 0's could equally as well be reversed in all cases such that the logic reference is 0's rather than referring to 1's. It should also be understood that the voltage levels representing 1's and 0's can be arbitrarily defined, it being necessary only to accommodate the logic circuits to perform those functions specified above. It should be further understood that the logic functions can be accomplished by well-known diode and transistor logic circuits of the discrete component type, or can be grouped such that the same logical functions are provided by more complex logic circuits. While the logic functions are shown as separate entities, some of the elements can be combined physically.

From above it will be recalled that the processor provides a sequence of control signals and addressing data for establishing what operation is to be performed and where the operation is to be performed in the display 42.

Additionally, the processor provides the data signals that specify the type of character to be displayed as well as the data that specifies the vectors that may be generated. The characters that are to be generated are supplied over line 44 to the character generator 50 which in turn provides the generation signals over line 52 to the display 42. When characters are to be displayed, it is necessary that several of the input control flip-flops, shown enclosed in dashed block 64, be set. Flip-flop F/F2, referred to as the random or tab flip-flop, must be set or cleared depending upon whether it is desired to display random or tabular characters. If random characters are to be displayed, a 1 signal must be applied on line 48-2, thereby establishing a 1 at the R output terminal and a 0 at the T output terminal. If tabular characters are to be displayed, it is necessary that a 0 be applied on line 48-2 such that, when inverted by I 64-2, it will provide a 1 at the C input terminal thereby establishing a 1 at the T output terminal and a 0 at the R output terminal. It is necessary also to display characters that a 0 be applied on line 48-3 such that I 64-3 provides a 1 signal to the C input terminal of F/F3, thereby providing a 1 at the C outpt terminal and a 0 at the V output terminal. It is necessary to select also whether the character is going to be displayed in the normal areas 12 or in the expandable area 14. For ease of reference, the expandable area 14 is referred to as the vector area. Accordingly, if the character is to be displayed in area 14 it is necessary to apply a 1 signal on line 84-4 to the S input terminal of F/F4, thereby providing a 1 signal on the ON output terminal and a 0 on the OFF output terminal If the character is to be displayed in the fixed areas 12, it is necessary to apply a 0 on line 48-4 such that I 64-4 provides a 1 to the C input terminal, thereby providing a 1 on the OFF output terminal and 0 on the ON output terminal. For the latter case, it is necessary to select between the top or the bottom area 12. In order to make this selection, a 1 signal on line 48-5 will result in F/F5 providing a 1 on the T output terminal and a 0 on the B output terminal. Alternatively, if it is desired to display the character at the bottom portion of the display 42, a 0 signal on line 48-5 will result in I 64-5 providing a 1 signal to the C input terminal which will result in a 1 at the B output terminal and a 0 at the T output terminal. It is necessary also for displaying a character that F/F6 be set. Accordingly, it is necessary to apply a 1 signal on line 48-6 to the S input terminal, thereby providing a 1 at the P output terminal and a 0 at the $\bar{P}$ output terminal. In the event that a 0 is applied to line 48-6, I 64-6 will result in a 1 being applied to the C input terminal whereby a 1 will appear at the $\bar{P}$ output terminal and a 0 a the P output terminal. This latter operation will result in blanking the beam. Finally, in order to display a character it is necessary to select between large and small characters. With a 1 applied to line 48-7, F/F7 will have a 1 signal at its 1 output terminal, thereby indicating a small character and will have a 0 at its 0 output terminal. The application of a 0 to line 48-7 will result in I 64-7 applying a 1 to the C input terminal, thereby providing a 1 at the 0 output terminal and indicating that a large character is to be displayed. By making the appropriate selections of those alternatives just described, a character of a predetermined small or large size will be displayed in the top or bottom area 12 or in the vector area 14 and the character will be either a random character or a tabular character. As a result of setting these control flip-flops, the remainder of the circuitry will be controlled automatically.

In determining the character spacing, which is performed automatically for tabular characters, attention is directed to the character spacing circuitry shown enclosed in dashed block 62. At the outset, let it be assumed that the Normal button selection is made such that a signal on line 74 directed to the expansion override circuit, shown enclosed within dashed block 76, results in a Normal output signal on line 77. This can readily be seen in that OR 76-1 will provide the 1 output signal directly on line 77. Further, I 76-2 will invert the 1 signal and result in a 0 on the Expand line 78. For the Normal selection it can be seen that AND 62-1 and AND 62-2 in the character spacing circuit 62 will be activated. Also, having made the selection of the character output of flip-flop F/F3, it can be seen that the output from the normalizing circuit 54 will be blocked. This follows since I 62-3, I 62-4, and I 62-5 will all provide 0 output signals such that AND 62-6, AND 62-7, and AND 62-8 will be disabled. At this point it should be pointed out that when the vector operation is selected such that a 0 is provided on the character line 66, the circuits I 62-3, I 62-4, and I 62-5 will provide enable signals to their respective AND circuits, thereby passing the output of the normalizing circuit 54 directly through to the register 62-10. However, for the display of characters, the normalizing circuit 54 is blocked and a selected increment for character spacing is provided to register 62-10. The character spacing is based on the selection of whether the character to be displayed is a small or a large character. Obviously, the large characters require more space on the display, hence will require a larger automatic spacing to accommodate successive larger characters. If it is assumed at the outset that a large character is to be displayed, a 1 signal will be provided from F/F7 on line 66-1 to AND 62-11. With the character signal provided on line 66, AND 62-11 will be enabled and will provide a 1 signal to AND 62-2 and AND 62-12. It will be recalled that for this example the Normal mode has been selected. Therefore, AND 62-2 is enabled and will provide a 1 signal to OR 62-13. This will result in a 1 being forced to the $i$th position of register 62-10. It can be seen that this will be a stage that provides a known increment over line 68 to the adder 56-1. It will be noted also that AND 62-12 is not activated since the Expand signal on line 78 is absent. Next assume that the size controlling flip-flop F/F7 has been so set to designated that the small character is to be displayed, such that a 1 appears on line 66-2, and together with the 1 signal on line 66 will activate AND 62-14. Since AND 62-1 has the Normal signal applied thereto, when coupled to the 1 signal provided from AND 62-14, there will be a 1 signal applied to OR 62-15. This will result in the $i$th$-1$ stage of register 62-10 being set. It can be seen that the value that will be passed to the adder 56-1 will provide the lesser spacing than that provided if the $i$th stage is set, thereby accommodating the small character spacing. The 1 output signal from AND 62-14 is also applied to AND 62-16, but since the Expand input signal is 0 there will be a 0 ouput signal to OR 62-17. It can be seen that this arrangement provides for a spacing between small and large characters of a power of two. If some spacing other than a power of two is desired, the appropriate translation circuitry can be provided for accommodating the setting of desired combination of stages in the register 62-10 for application to the adder 56-1.

Next let is be assumed that one of the sector selection pushbuttons has been activated for expanding a desired sector, thereby de-activating the signal on line 74. By de-activating the line 74, OR 76-1 in the expansion override circuit 76 will result in a 0 being applied to I 76-2 and will result in a 1 (Expand) signal on line 78. Again referring to the character spacing circuit 62, it can be seen that the Expand signal on line 68 will result in AND 62-16 and AND 62-12 being enabled. Then depending upon the selection of large or small characters, as determined by the signals on line 66-1 and 66-2, either AND 62-16 or AND 62-12 will provide the spacing constant for register 2-10. For the small character, AND 62-16 will be activated thereby passing a 1 signal through OR 62-17 and setting the $i$th$-2$ stage. For the large character, AND 62-12 will be activated, thereby passing a 1 signal through OR 62-15 to the $i$th$-1$ stage of the 62-10 register. In the expanded mode, the spacing selected as shown will be compensated by the path selectd in th output gating circuit, shown enclosed in dashed block 70. This will be described in more detail below. Having determined the value of the increment that is to be automatically added for spacing the tabular characters, and having provided the increment value on line 68 to adder 56–1, which receives as its other input the value held in the horizontal storage register 56–2 via line 56–3, it is necessary to determine the requirements for enabling AND 56–4. Returning to the input control flip-flops, it will be recalled that to display a character it is necessary for F/F3 to provide a 1 on the C output terminal. This signal is applied to AND 76–3 in the expansion override circuit. In order to display tabular characters it is necessary that F/F2 provide a 1 on the T output terminal. Accordingly, a 0 signal will be applied at the R output terminal to AND 76–3. This will result in a 0 being applied on line 76–4 to OR 76–5. Also, in order to display a character it is necessary that the paint circuit F/F6 have a 1 at the P output terminal. Accordingly, the $\overline{P}$ output terminal will apply a 0 to AND 76–6, thereby applying a 0 to OR 76–5. With both input terminals receiving a 0, OR 76–5 will provide a 0 output signal on line 96 to the arithmetic circuit 56. This 0 signal will be applied to I 56–5 where it will be inverted to a 1 signal thereby enabling AND 56–4 and allowing the result that is provided by the adder to be gated to the horizontal storage register 56–2. The 0 signal applied to AND 56–6 will inhibit the transfer of the data provided on line 46' to the horizontal storage register 56–2. Therefore, having selected the appropriate increment to be added to the previously existing position of the beam, as determined by the horizontal storage register, and having gated this combined value to the horizontal storage register, the output gating circuitry 70 can be considered for establishing the ultimate position that the beam will be moved to for painting a character.

Again assuming that the normal mode has been selected such that a 1 signal is present on line 77, and that the normal increments have been selected in the character spacing circuit 62, it can be seen that the circuits AND 70–1, AND 70–2, AND 70–3, and AND 70–4 are enabled. These circuits receive input signals from respectively associated stages of the horizontal storage register 56–2. Accordingly, by activating these AND circuits the value stored in the horizontal storage register is passed through the respective AND circuits ultimately to the horizontal output register 58–1. It can be seen that AND 70–1 provides its signal directly to the associated stage of the horizontal output register; AND 70–2 provides its output signal to OR 70–5; AND 70–3 provides its output signal to OR 70–6; and AND 70–4 provides its output signal to OR 70–7. From this operation it can be seen that the increment selected between tabular characters and provided in the character spacing circuit 62 has been added to the previously existing beam position and gated directly to the horizontal output register 58–1.

Next assume that the expand mode of operation has been selected such that a 1 signal is provided on line 78. The 1 signal on line 78 operates to activate AND 70–8, AND 70–9, AND 70–10, and AND 70–11. For reasons that will become more clear when the vector generation is explained, it will be seen that the gating for the expand mode results in the output gating circuit of the value being shifted one place thereby multiplying the value by 2. Referring again to the character spacing circuit operation, it will be recalled that for the expand mode the increment was in fact divided by a factor of 2. Accordingly, when the two operations are combined for tabular characters in the expand mode it can be seen that the result is that the spacing stays the same as that for the normal mode. The shifting is accomplished by the lowest stage of the horizontal storage register 56–2 being directed to AND 70–8, which is enabled by the Expand signal such that the signal is passed through to OR 70–5 to the next higher ordered stage in the horizontal output register 58–1. This same operation proceeds as a shift for all stages of the horizontal storage register except the highest ordered stage, which is discarded for the expand mode. The value of the highest ordered stage that will result in the horizontal output register 58–1 will be determined by the value of the two highest ordered stages in the horizontal storage register 56–2. It can be seen that the highest ordered stage is directed over cable 90 on conductor 90–1 to the blanking decoding circuit 88. Further, the next to the highest ordered stage is directed over cable 90 on conductor 90–2 to the blanking decoding circuit. The value of the highest ordered stage will depend upon the sector selected. For the horizontal circuitry, the selection of sectors 2, 5, or 8 will result in a 1 output signal over line 86–1 which will result in a 1 signal on line 86–2 which is provided as an enable signal to AND 70–11. It can be seen that the next to the highest ordered stage is coupled as an input to I 70–12. Accordingly, in the expand mode for sectors 2, 5 or 8, in the horizontal selection, the complement of the next to the highest ordered stage in the horizontal storage register will be applied to OR 70–7 and will reside ultimately in the highest ordered stage of the horizontal output register 58–1. This 1 signal resulting on line 86–1 will also be applied to I 88–1 in the blanking decoding circuit such that a 0 is provided on line 92–1 to AND 70–10, thereby inhibiting the transfer of the true value through AND 70–10. Alternatively, if any sector other than sectors 2, 5 or 8 are selected, there will be a 0 on line 86–1, such that a 0 is applied on line 86–2. This will result in inhibiting AND 70–11. The 0 signal will also be applied to I 88–1, which in turn will provide a 1 on line 92–1 to AND 70–10. This will enable the true value of the next to the highest ordered stage in the horizontal storage register 56–2 to be passed through OR 70–7 to the highest ordered stage of 58–1.

When the operation is selected to be in the expanded mode, it is necessary to select one of the sector selection pushbuttons for the desired sector. These pushbuttons for a nine sector array are utilized to control three OR circuits which comprise the sector selector shown enclosed within dashed block 72 for the horizontal selection. Sector selections 1, 4 and 7 are directed to OR 72–1; sector selections 2, 5 and 8 are directed to OR 72–2; and selections 3, 6 and 9 are directed to OR 72–3. It should be noted that various combinations of these same selections are directed to the vertical controls. It is the function of the sector selector 72 for the horizontal, and the corresponding sector selector (not shown) for the vertical control, to establish which of the segments must be blanked during the displaying operation. The output terminals from the sector selector 72 are directed to the blanking decoding circuit shown enclosed in dashed block 88. These signals in combination with the signals derived from the two highest ordered digits of the horizontal storage register 56–2 are utilized for determining when the electron beam is to be in the active or in the blanked condition. The selection of sectors 1, 4 or 7 is directed over line 86–4 to AND 88–2. The result of the selection of sectors 2, 5 or 8 is directed over line 86–1 to AND 88–3; and the result of the selection of sectors 3, 6 or 9 is directed over line 86–3 to AND 88–4. The output signals from AND 88–2, AND 88–3, and 88–4 are directed to OR 88–5, which in turn provide an output on line 92–2 as one of the input signals to AND 82. The output of OR 88–5 is also directed on line 92–2' to OR 80–1 in the blanking circuit, shown enclosed in dashed block 80. Any input condition that results in a 1 signal on line 92–2 results in the beam being blanked.

It can be seen that for each of the three sets of sectors that a different combination of the higher ordered two digits of the horizontal storage register 56–2 is utilized to control the blanking operation. For sections 1, 4 and 7, the addressing is such that when the highest ordered digit is a 1, as indicated on line 90–1, AND 88–2 provides a 1 output to OR 88–5. The highest ordered digit is also directed to I 88–6 where it is inverted and directed as an input over line 88–7 to AND 88–4. Therefore, for sectors 3, 6 or 9 when the highest ordered digit is 0 it will be inverted to a 1 signal by I 88–6, and will complete the input requirements for AND 88–4 to provide a 1 OR 88–5. Finally, it is necessary to consider the highest ordered and the next highest ordered digits in the horizontal storage register in establishing which of the addressing combinations must be blanked for sectors 2, 5 or 8. The highest ordered digit is directed Exclusive-OR 88–8, together with the next highest ordered digit, which is carried over line 90–2. As indicated above, the function of the Exclusive-OR is to provide a 1 at the output terminal if, and only if, the input signals are dissimilar. In the event that the input signals are alike, whether they both be 0 or 1, the output signal will be 0. The output from the Exclusive-OR is directed on line 88–9 as an input to AND 88–3. Therefore, when the higher ordered two digits are dissimilar and either sectors 2, 5 or 8 is selected, the input signals to AND 88–3 will be such that a 1 signal is provided to OR 88–5. If, then, the system is in the expand mode such that AND 82 is receiving a 1 signal on line 78–1, and any of the input conditions just described are present so that a 1 signal is present on line 92–2, AND 82 will provide a 1 signal on line 84. This will control the operation of the horizontal output register 58–1. It will be recalled from above, that when the beam position is directed to tend to move to an off-screen position, the system has been designed such that the beam will be blanked and the complement value will be utilized to move the blanked beam in an image pattern on-screen. In order to accomplish this, with the advent of a 1 signal on line 84, the 1 signal is applied on line 84–1 to enable the transmission of the complement of the value stored in the horizontal output register 58–1 to the D/A conversion circuitry for driving the beam on-screen. The signal received on line 84 is also directed to I 58–2. For those situations when the beam is found to be on-screen, AND 82 will provide a 0 on line 84. This 0 will be inverted by I 58–2 and result in a 1 signal on line 58–3. This will enable the transmission of the normal, or true value, of the address stored in the horizontal output register 58–1. In this manner it can be seen that one of the objectives of the invention of retaining the beam on-screen for all operations has been achieved.

Turning now to a consideration of the expansion override circuitry shown enclosed within dashed block 76, it can be seen that all of the input control flip-flops 64 with the exception of the character size. F/F7, are utilized in the control operations of the expansion override circuitry. As described previously, AND 76–3 is enabled on the condition that a random character is selected by F/F2 and a character selection is made in F/F3. The result of this selection is to provide a 1 signal on line 76–7 as one input to AND 76–8, and to provide an input on line 76–4 to OR 76–5. AND 76–8 is one of the control circuits utilized in establishing that the electron beam should be enabled. When character generator 50 is operative to paint a character, it also provides intensity control signals on lines 50–1. These control signals are directed to OR 76–9 where it is directed to AND 76–8 and AND 76–10. The final condition for enabling AND 76–8 is that it be determined that the beam has been positioned to the desired location as indicated by F/F1 being set such that a 1 signal is provided at the END output terminal on line 79–1. This signal is directed to the processor to tell the processor that the display system is ready to receive further input commands, and is also directed on line 76–11 as an input to AND 76–8, thereby indicating that a random character can be displayed. The 1 signal derived on line 100 is directed to OR 80–2 in the blanking circuit. The result of a 1 being directed to OR 80–2 is to provide a 1 to AND 80–3. At the same time, the paint flip-flop F/F6 has been set such that the $\overline{P}$ output terminal is at the 0 level. Accordingly, AND 76–6 provides a 0 output on line 102, which is directed to OR 80–4. The 0 signal to OR 80–4, if all other inputs are 0, results in a 0 signal being directed to I 80–5 where it will be inverted to provide a 1 signal on line 80–6 to AND 80–3. This condition will result in AND 80–3 being activated to provide a 1 on line 94, thereby enabling the electron beam. Should the condition be set that F/F6 is providing a 1 output signal on the $\overline{P}$ output terminal and the flip-flop F/F3 is set such that a 1 is being provided on the V output terminal, AND 76–6 will provide a 1 on line 102 as an input to OR 80–4. This 1 will result in a 0 being provided by I 80–5 to line 80–6. This will disable AND 80–3 and cause the intensity enable to be removed, thereby blanking the electron beam. AND 76–12 requires that F/F6 be set such that a 1 signal is provided at the P output terminal, that F/F3 be set such that a 1 is provided at the V output terminal, and that the beam flip-flop F/F1 be cleared such that a 1 is provided at the $\overline{END}$ output terminal, in order to provide a 1 output signal on line 104 to OR 80–2, thereby blanking the beam. AND 76–13 and AND 76–14 provide the control for the override for tab characters to be written in the top or bottom portion of the display 42 even though the display is in the expanded mode. AND 76–13 is activated by a signal from F/F5 indicating that the selection is for the bottom of the screen; the selection from F/F3 indicating that a character is to be painted; the selection from F/F2 that the character is to be a tab character; and the selection from F/F4 that the display is to be off the vector area 14. When these conditions exist, all of the input signals to AND 76–13 will be 1 and the output signal on line 76–15 will be a 1. This signal is directed to OR 76–1 where it will be directed as an output over line 77 as a Normal signal indicating that there is a normal mode. The same signal from AND 76–13 is also provided on line 76–16 to OR 76–17. A 1 signal directed to OR 76–17 will be provided as one of the input signals on line 76–18 to AND 76–10. A 1 at this point will complete the selection such that AND 76–10 will provide a 1 signal on line 106 to OR 80–2, thereby providing one of the means of activating AND 80–3 for providing an intensity enable on line 94. This will allow the tabular character to be painted. Returning to a consideration of AND 76–14 it will be seen that it will be activated under tthe same conditions as AND 76–13, with the exception that F/F5 will be in the Set condition, whereby a 1 will be present at the T output terminal indicating that the display is to be at the top portion of the display screen. When the other input conditions are met, AND 76–14 will provide 1 output signal on line line 76–19 to OR 76–1 where it will again cause a Normal signal to be impressed on line 77 indicating that there is a normal mode.

Additionally, a 1 signal will be provided on line 76–20 as an input to OR 76–17. Again, AND 76–10 will be activated and will provide a 1 signal on line 106 for enabling the intensity control. It can be seen, therefore, that another of the objectives of the invention has been fully described in that the character display in the portions 12 of the screen can proceed in a normal manner, that is unexpanded, even though the expanded mode for area 14 has been selected. This operation is carried forward without disturbing the circuitry that will permit the expanded operation to continue once the characters have been displayed in the areas 12.

Turning next to the consideration of a blanking circuitry, shown enclosed in dashed block 80, there has already been discussed some of the operation that permits the enabling of the intensity control for unblanking the electron beam. There are several ways in which the electron beam can be blanked. As previously described, the output signal from OR 88–5 in the blanking decoder circuitry 88 is directed on line 92–2' to OR 80–1. When this signal is a 1, it is provided on line 80–7 as an input to AND 80–8 and on line 80–9 as an input to AND 80–10. When the display is in the expanded mode, as provided by a 1 signal on line 78, there will be a signal applied on line 78–2 to AND 80–8 and on line 78–3 to AND 80–10. These 1 signals provided to AND 80–10 will result in a 1 being directed over line 80–11 to OR 80–4. The 1 output signal from OR 80–4 will be inverted by I 80–5, and will result in AND 80–3 being disabled; hence, will result in the beam being blanked. Returning briefly to the expansion override circuitry 76, it can be seen that AND 76–21 will provide a 1 output when F/F4 is set, thereby indicating that the display is on area 14; F/F3 is cleared, thereby indicating that a character is being painted; and F/F2 is cleared, thereby indicating that tab characters are to be painted. Under this condition, AND 76–21 will provide a 1 signal to OR 76–17, thereby resulting in a 1 signal on line 106. It will also provide a 1 signal on line 108 to AND 80–8, thereby completing the requirements to provide a 1 signal to the Set input terminal of the blanking flip-flop 80–12. The setting of blanking flip-flop 80–12 will result in a 1 signal on line 80–13 being provided as an input to OR 80–4. Again, the 1 input to I 80–5 will result in a 0 on line 80–6 disabling AND 80–3 and blanking the beam. The signal on line 108 is also applied to I 80–14. Since a 1 signal is received, a 0 will be provided to the C input terminal, and will have no effect on the blanking flip-flop. At such time as any of the control flip-flops F/F4, F/F3, or F/F2 are altered, the control AND 76–21 will provide a 0 signal on line 108. Then, I 80–14 will provide a 1 to the Clear input terminal of the blanking flip-flop 80–12, and will result in a 0 being applied on line 80–13 thereby permitting other control signals to enable the electron beam intensity. It is this feature that controls the blanking of tab characers that are started outside of a selected sector and continues the blanking even though the tab characters extend into the selected sector. The control of the blanking flip-flop 80–12 is such as to hold the beam blanked until such time as the sequence of tab characters has been terminated.

Having considered the displaying of various kinds of characters and the various operational selections that can be made with regard to characters, it is now appropriate to consider some of the applications that are available in this invention for the displaying of vector quantities. One such possibility is the use of the vector control for positioning a blanked beam for either starting a vector, or starting a series of tabular characters, or for displaying a random character. For this operation, the input control flip-flops F/F6 and F/F3 are to be considered. The paint flip-flop must be in a condition such that it is cleared, thereby providing a 1 on output terminal $\overline{P}$. This indicates that the beam is to be blanked. Secondly, F/F3 must be set such that a 1 is provided at the V output terminal, thereby indicating that a vector operation is to be made. These two signals are directed to AND 76–6 which in turn provides a 1 signal to OR 76–5. The 1 to OR 76–5 puts a 1 on line 96, where it is directed to AND 56–6. The other input signals to AND 56–6 are the input control signals received on line 46'. The enabling of AND 56–6 results in the input signals bypassing the normalizing circuit and the character spacing circuits and being applied directly to the horizontal storage register 56–2. For the gross movement of this operation, the input command is an address that references the beam position with regard to a reference position. This value is forced to the horizontal storage register and from there is directed to the output gating circuit where it controls the operation of the horizontal output register and causes the beam to be moved to the position specified. It will be recalled also that AND 76–6 provides a signal on line 102 such that when it is a 1 signal, it will provide a control of OR 80–4 to cause a 1 to be applied to I 80–5. In turn, I 80–5 will invert the signal to a 0 and disable the intensity enable, thereby blanking the beam.

As previously indicated, a vector operation results in the use of the normalizing circuit when the vector exceeds a predetermined value. When the vector signals are normalized, a counter 110 is set depending upon the number of shifted positions that are accommodated by the normalizing operation. This counter then operates to count down for the number of segments that must be gated into the adder 56–1. While the counter is counting, 0 signals are applied to the set input terminal of F/F1 and I 64–1 operates to hold F/F1 in the cleared state. When the counter has counted through all of the segments, a 1 signal is applied to the Set input terminal and the flip-flop is switched to a set condition, indicating that the beam is at the end thereof. The flip-flop F/F3 operates to control the operation for the vector quantity. When this flip-flop is Set such that a 1 signal is applied at the V output terminal thereof, a 0 is provided at the C output terminal, as previously described. This 0 output signal is provided over line 66 as an input to the I 62–3, I 62–4, and I 62–5. These 0 signals are inverted and function to enable AND 62–6, AND 62–7, and AND 62–8. By enabling these AND circuits, the value of the increment in the normalizing circuit is passed through directly to the register 62–10. This value is in turn carried over line 68 to the adder where it is combined with the previous beam position as determined by the horizontal storage register 56–2. The increments are continually added for the vector until such time as the counter has counted to 0. In order to establish the condition of the electron beam, it is necessary to look at the input signals to AND 76–12. For the vector operation, a 1 signal will be applied at the V output terminal of F/F3, The paint flip-flop F/F6 will be in the Set condition and applying a 1 at the P output terminal. Since the vector has not been completed, the beam control flip-flop F/F1 will provide a 1 at the $\overline{END}$ output terminal. Since all of the input signals to AND 76–12 are of the 1 state, a 1 will be provided on line 104 to OR 80–2. Since no conditions are available at this time to disable the input signal on line 80–6, AND 80–3 will provide the beam intensity enable on line 94 and the vector will be displayed. It can be seen that the value of the vector will not be altered depending on the selection of normal or expand mode. However it will be seen that the selection of the expand mode will alter the location of the vector by controlling the transmission from the horizontal storage register 56–2 through the output gating circuit 70 to the horizontal output register 58–1.

It is apparent that various other combinations and sequences of operations can be visualized, but it is believed that the foregoing fully describes the capability of the improved display system and clearly defines the operability of the circuitry.

Having set forth the various purposes and objectives of the invention, and having fully described an embodiment which achieves the various objectives and purposes, it being understood that various modifications in the implementation or operation will become apparent to those skilled in the art without departing from the spirit of the invention, what is intended to be protected by Letters Patent is set forth in the appended claims.

I claim:

1. In a display system having a cathode ray tube with a viewing screen and circuitry for controlling an electron beam for displaying data on the screen, the improvement comprising:
    means for controlling the electron beam for displaying data on the screen of the cathode ray tube; and
    display control means coupled to the cathode ray tube for causing data to be displayed in a first display mode in a first area on said screen and for selectively causing data to be alternatively displayed in said first display mode or in a second display mode in a second area on said screen, said display control means including an expansion control circuit means for expanding the scale of said data in a selected sector of said second area on said screen to said second display mode without disturbing said first display mode of said data in said first area, said expansion control circuit means including sector selection means for selecting a particular sector of said second area to be displayed in said second display mode, electron beam blanking decoder means coupled to said sector selector means for producing a first detection signal when said electron beam is caused to tend to move out of said selected expanded sector in said second area, and a second detection signal when said electron beam is caused to move within said selected expanded sector in said second area, and blanking circuit means coupled to said beam blanking decoder means for blanking said electron beam in response to said first detection signal and for unblanking said electron beam in response to said second signal.

2. A display system as in claim 1 and further including normal selector means for selecting said first display mode of data in said first area and said second area on said screen.

3. A display system as in claim 1 further including:
signal receiving means for receiving and at least temporarily storing a character control signal representing that character data is to be displayed in said first area; and
override control means coupled to said signal receiving means and said expansion control circuit means for temporarily overriding said expansion control circuit means to cause said first display mode when said character control signal is reecived.

4. A display system as in claim 3 and including character spacing means for automatically causing character data to be spaced in predetermined increments on the viewing screen.

5. A display as in claim 4 including character size spacing control means for providing a specifically associated predetermined fixed spacing increment for each character size available.

6. A display system as in claim 1 and further including:
detecting means coupled to said display control means for producing an off-screen signal when the digital beam position data tends to force said electron beam out of said selected sector of said second area;
beam blanking means coupled to said detecting means for blanking said beam when said off-screen signal occurs; and
arithmetic means coupled to said detection means for causing the complement of said digital beam position to be used for locating said beam, whereby the blanked beam will follow an on-screen path.

7. A display system as in claim 1 further including:
detecting means coupled to said display means for producing an off-screen signal when the digital beam position data tends to force said electron beam out of said selected sector of said second area;
receiving means for receiving tabular character signals representing tabular characters are to be displayed with a character spacing that is not to be expanded; and
blanking means coupled to said detecting means and to said receiving means for blanking said electron beam whenever said off-screen signal and said tabular character signals are present, said blanking means including holding means for holding said electron beam blanked until said tabular character signal is removed even when said off-screen signal is removed, whereby tabular characters which begin out of said selected sector are blanked and the blanking continues even though the tabular characters continue into said selected sector.

8. A display system as in claim 7 and further including:
first means coupled to said expansion control circuit for producing an expansion signal when a particular sector is selected; and
second means coupled to said first means and to said receiving means for preventing expansion of spacing between said tabular characters when said expansion signal is present.

9. A display system as in claim 7 and further including:
random character signal receiving means for receiving signals representing that random characters are to be displayed in said second display mode; and
means coupled to said detecting means and to said random character signal receiving means for producing an electron beam blanking signal when said off-screen signal is present, whereby random characters out of said selected sector are blanked.

References Cited

UNITED STATES PATENTS

| | | | |
|---|---|---|---|
| 2,543,719 | 2/1951 | Clark | 315—27 |
| 2,580,977 | 1/1952 | Tourshou et al. | 315—27 |
| 2,849,609 | 8/1958 | Casey | 178—7.5 |
| 3,056,918 | 10/1962 | Lindberg et al. | 315—19 X |
| 3,119,949 | 1/1964 | Greatbatch et al. | 178—7.5 |
| 3,432,873 | 4/1969 | Eggert | 315—22 |

RODNEY D. BENNETT, JR., Primary Examiner

BRIAN L. RIBANDO, Assistant Examiner

U.S. Cl. X.R.

178—7.5; 315—22